US010045524B2

(12) United States Patent
Nofziger

(10) Patent No.: US 10,045,524 B2
(45) Date of Patent: Aug. 14, 2018

(54) BIRD-SCARING DEVICE

(71) Applicant: Arnold Nofziger, Canby, OR (US)

(72) Inventor: Arnold Nofziger, Canby, OR (US)

(\*) Notice: Subject to any disclaimer, the term of this patent is extended or adjusted under 35 U.S.C. 154(b) by 258 days.

(21) Appl. No.: 14/990,586

(22) Filed: Jan. 7, 2016

(65) Prior Publication Data
US 2016/0192636 A1 Jul. 7, 2016

Related U.S. Application Data

(60) Provisional application No. 62/100,837, filed on Jan. 7, 2015.

(51) Int. Cl.
*A01M 29/06* (2011.01)
(52) U.S. Cl.
CPC .................... *A01M 29/06* (2013.01)
(58) Field of Classification Search
CPC ...... A01M 29/00; A01M 29/06; A01M 29/10; A01M 29/16; B64C 39/024; B64C 2201/021; B64C 2201/042; B64C 2201/12; B64C 2201/145
USPC ...................... 116/22 A; 43/2, 3; 40/439, 591
See application file for complete search history.

(56) References Cited

U.S. PATENT DOCUMENTS 5,595,012 A \* 1/1997 Coleman ............... A01M 31/06
43/3
5,832,649 A 11/1998 Kilgore
6,807,765 B2 10/2004 Watermann
2005/0241564 A1 11/2005 Guadagna
2012/0258264 A1 \* 10/2012 Kyoden ................. A01M 29/06
428/16
2013/0061817 A1 \* 3/2013 Matzel .................. A01M 29/06
119/712

FOREIGN PATENT DOCUMENTS

CA 2122761 A1 11/1995
EP 0127404 A1 12/1984

\* cited by examiner

*Primary Examiner* — Peter Macchiarolo
*Assistant Examiner* — Irving A Campbell
(74) *Attorney, Agent, or Firm* — McCoy Russell LLP

(57) ABSTRACT

The present disclosure relates to a bird-scaring device. The bird-scaring device simulates a predatory bird in flight. The bird-scaring device is comprised of an upper body segment, a lower body segment, a middle body segment with a pair of wings, a positioning element, a positioning element mount and an upper fastening element and a lower fastening element for the slidable positioning of the bird-scaring device. The bird-scaring device may have unexpected and unpredictable motion as it slides between the upper and lower fastening element, sways with the positioning element and pivots on the positioning element mount. The wings may project laterally from the middle segment of the body and also may move in the wind to simulate the natural flying motion of a bird. In this way, the bird-scaring device may generate unpredictable, realistic predator bird motion to dispel pest birds.

18 Claims, 5 Drawing Sheets

BIRD-SCARING DEVICE

CROSS REFERENCE TO RELATED APPLICATIONS

The present application claims priority to U.S. Patent Application No. 62/100,837, entitled "BIRD-SCARING DEVICE," filed on Jan. 7, 2015, the entire contents of which are hereby incorporated by reference for all purposes.

FIELD OF THE INVENTION

The invention generally relates to a bird-scaring device for dispelling pest birds.

BACKGROUND/SUMMARY

Pest birds may be a nuisance in a number of different environments. For example, pest birds may cause agricultural damage. Other birds may also be considered pest birds, such as migratory birds and flocking birds, as they may create hazardous or unwanted conditions in certain environments. For example, migratory birds, such as geese, may flock on open grounds, such as sports fields, golf courses, parks and other areas. The birds may be considered a nuisance in these environments, and in some circumstances, may be considered a health risk due to the bird excrement on the fields and in the water ways. Additional efforts may be necessary to keep such grounds clean of bird excrement and to keep birds out of such spaces. Similarly, pest birds, including migratory and flocking birds, may establish a presence on other grounds, such as airstrips. The presence of the pest birds in these environments may create dangerous conditions for landing and arriving aircraft.

As a more specific non-limiting example, common agricultural pest birds cause significant damage to several crops and reduce growers' ability to provide agricultural commodities to the market. Pest birds such as pigeons, doves, crows, sparrows, starlings, and blackbirds feed on food crops and fruits causing widespread damage. Pest birds are known to consume grain crops, such as, rice, corn, wheat, rye, legumes, and such others. The birds also feed on newly seeded and emergent crops. Additionally, pest birds also feed on all kinds of fruits including grapes, blueberries, cherries, apples, and so forth. The multiplier effects of this type of damage may be great since the agricultural sector typically provides inputs to several other sectors in the economy, such as, manufacturing, retail trade, and food services. Therefore, such crop and fruit damage caused by pest birds impact all levels of the economy, not just the individual grower.

A number of conventional methods may be used to combat the pest birds in the different environments, including, but not limited to, avicides, trapping and exclusionary fencing. However, killing pest birds has been considered ineffective and inhumane.

Other pest bird control methods include the use of traditional static bird decoys, and optical and sound signal generating devices. However, none of these methods are effective for large areas such as large fields, fruit plantations, horticulture plots. Additionally, the effectiveness of these systems rapidly decreases after installation or implementation since pest birds usually adapt quickly to most static bird decoys and other visual or sound effects of deterrent devices. Additionally, some decoy devices include hinge mechanisms for replicating flapping wing movements. However, such hinge mechanism may produce noisy, interrupted, unrealistic wing movements, which in due course of time, may be recognized by pest birds as non-threatening.

The inventor herein recognized the above problems and discloses herein a bird-scaring device including flight characteristics of a predatory bird, to dispel pest birds from crops and fruits, and thereby, reducing agricultural and economical damage. As described in detail below, the non-static nature of the bird-scaring device of the subject disclosure may be advantageous in providing a dynamic device, utilizing natural forces of the wind to rotate and move. In one approach, the bird-scaring device may include a positioning element where the height of the bird-scaring device on the positioning element is adjustable. The bird-scaring device may move in a vertical motion along the positioning element between two fastening elements or stops. Further, the positioning element may sway in the wind to provide an additional motion to the bird-scaring device. In another approach, the body may be pivotally mounted. The absence of fastening elements for wings, tail end and head end may provide smooth uninterrupted movement. Further, configuration of the components of the bird-scaring device enables easy assembly by the user. Hence, such bird-scaring devices may be cost efficient, environmentally friendly and provide a humane way to control pest birds.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present description relates to a bird-scaring device 10 configured to replicate a predatory bird in flight. The bird-scaring device may be vertically mounted such that the height of the device may be varied during wind events.

Further, in some examples, the scaring device may be selectively positioned based on the desired height of the crops or fruit plants under pest bird threat. The predatory bird resemblance mentioned above, includes, but is not limited to, resemblance to peregrine falcons, falcons, eagles, hawks and the like. Pest birds such as pigeons, blackbirds, crows, starlings, are generally scared of predatory birds mentioned above. Other pest birds, include, but are not limited to migratory birds, such as geese, and flocking birds, including gulls and other birds. Although described in regards to use with farm crops and fruit farms, it should be appreciated that the bird-scaring device may be used in a number of different applications, including, but not limited to, sport fields, golf courses, air strips, parks, docks, etc.

Figures 1, 2:
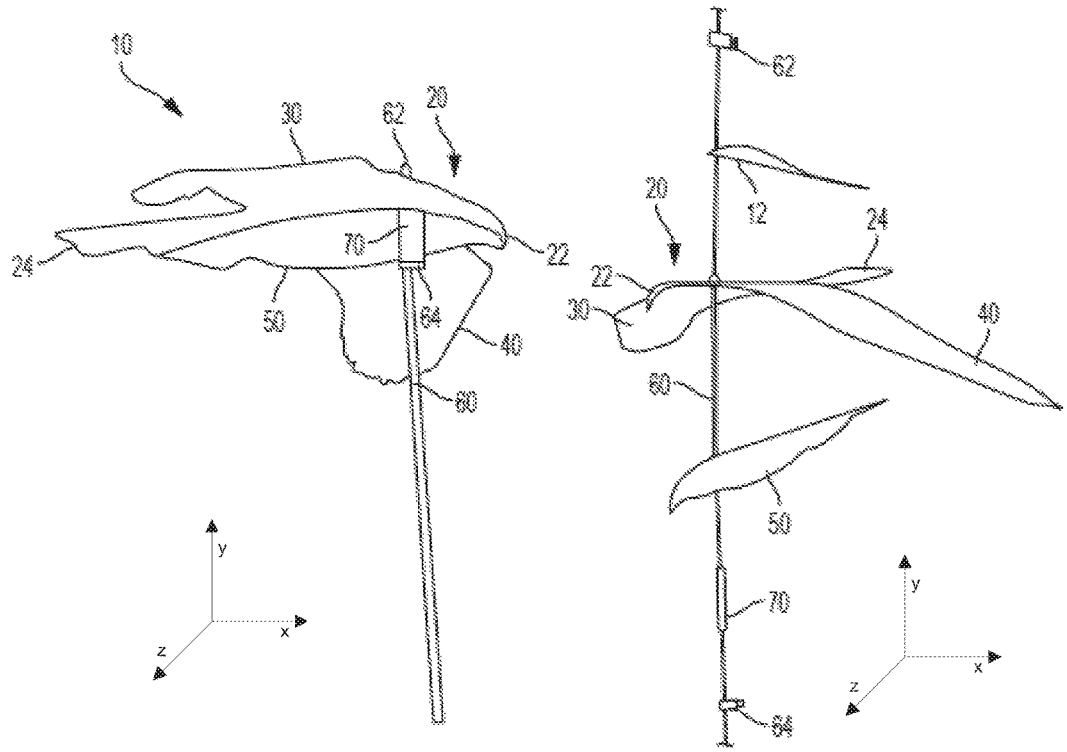
FIG. 1 is an elevational view of an embodiment of a bird-scaring device resembling a predatory bird in flight, according to the present disclosure.
FIG. 2 is an exploded view of the embodiment of FIG. 1.
Figure 3:
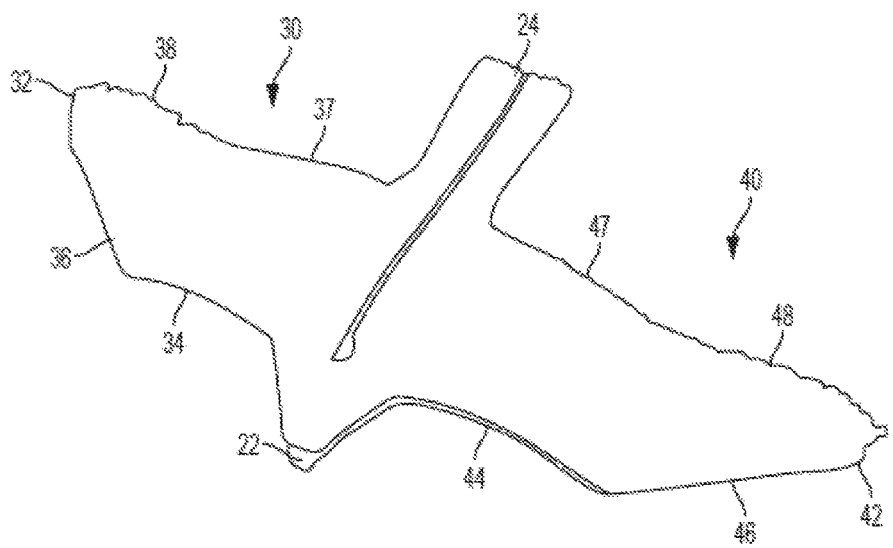
FIG. 3 is a top perspective view of the embodiment of FIG. 1.
Figure 4:
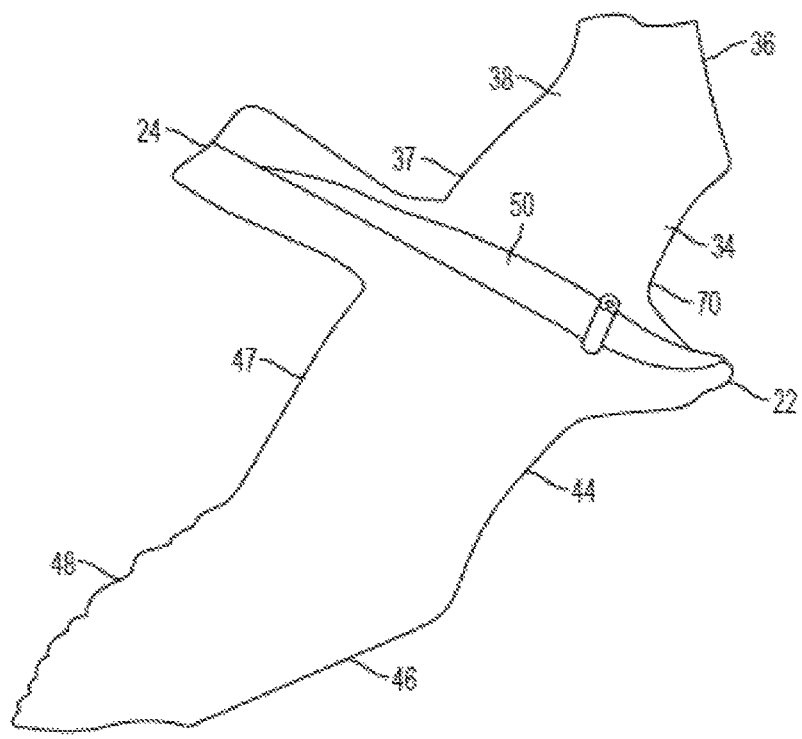
FIG. 4 is a bottom perspective view of the embodiment of FIG. 1.
Figure 5:
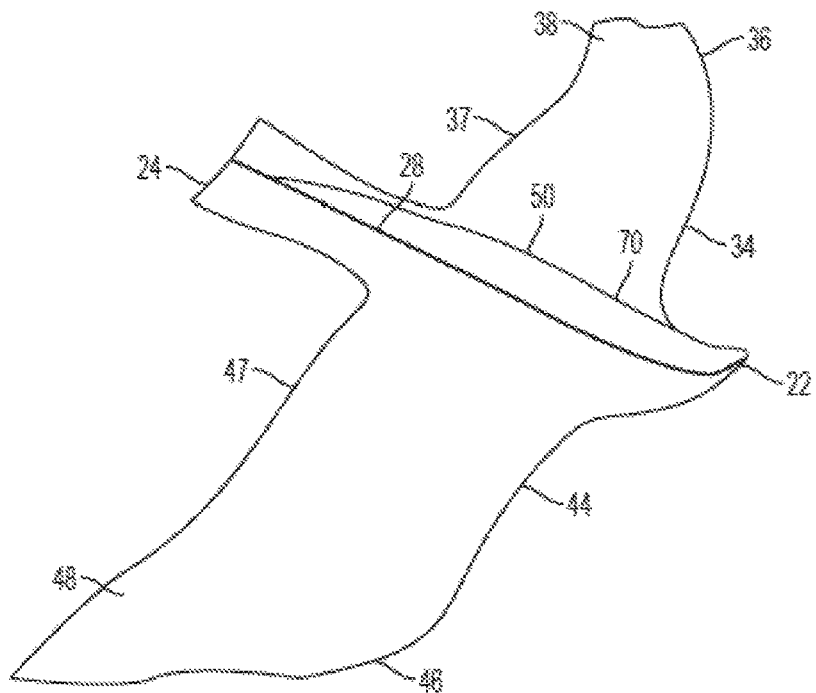
FIG. 5 is a bottom perspective view of the embodiment of FIG. 1
Figure 6:
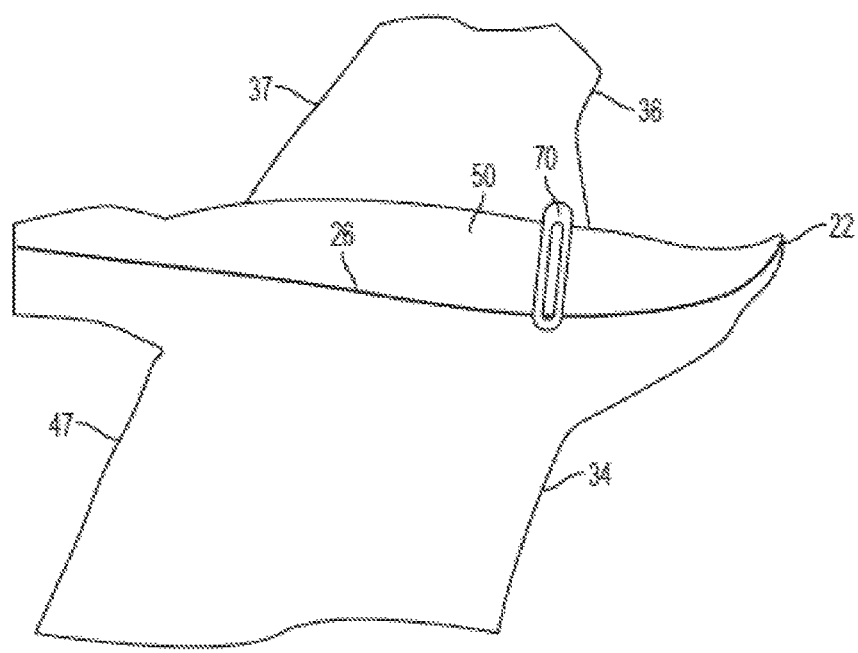
FIG. 6 is another bottom perspective view of the embodiment of FIG. 1.
Figure 7:
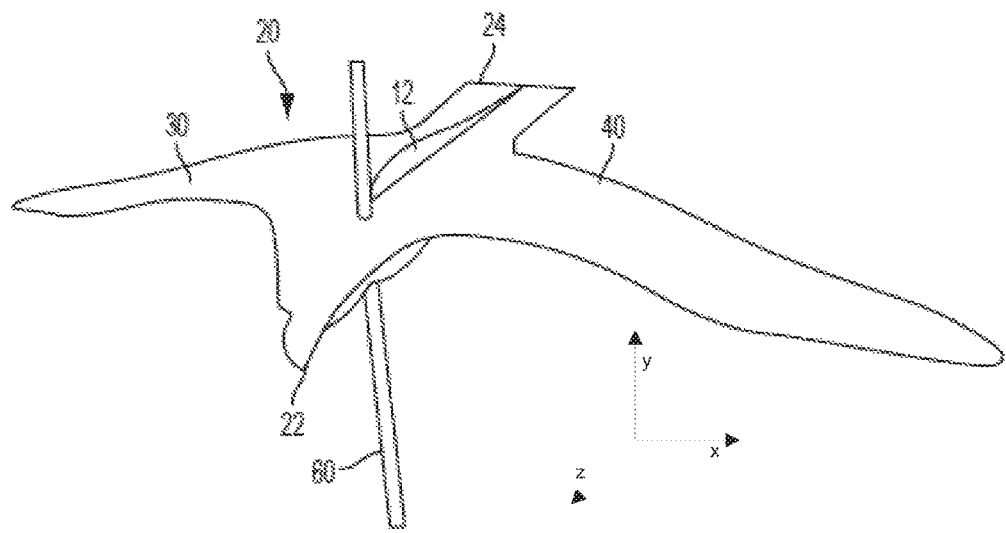
FIG. 7 is a top elevational view of the embodiment of FIG. 1.
Figure 8:
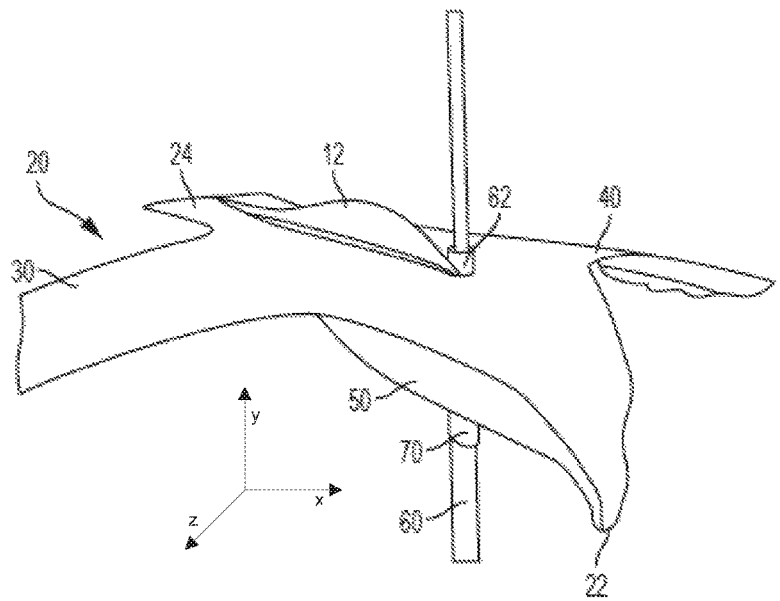
FIG. 8 is a side elevational view of the embodiment of FIG. 1.
Figure 9:
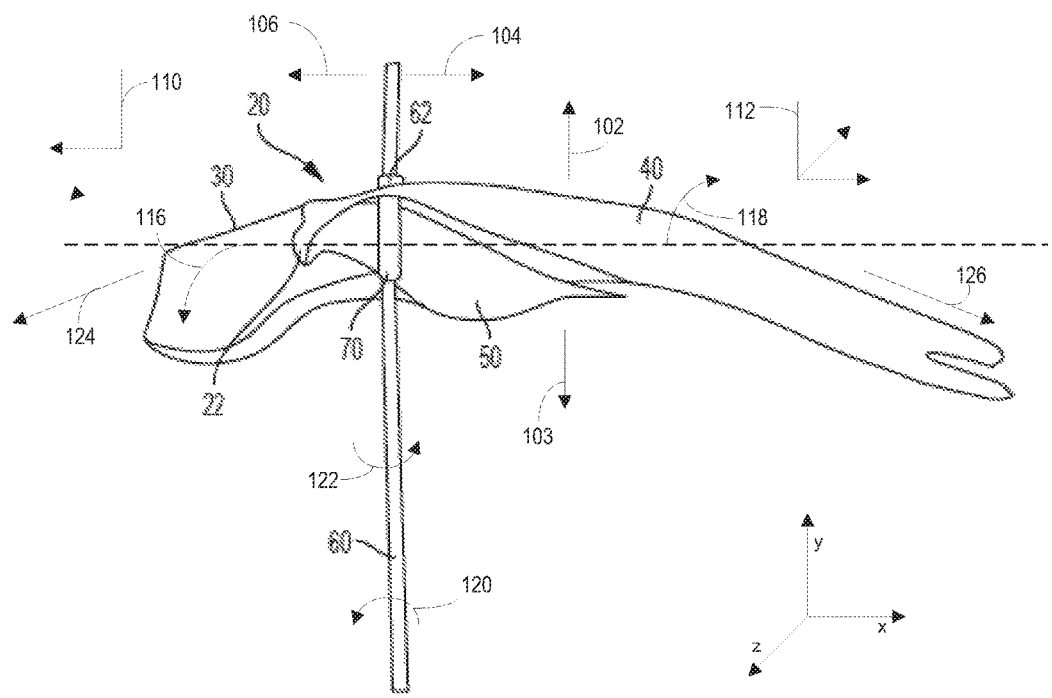
FIG. 9 is another side elevational view of the embodiment of FIG. 1 illustrating degree of freedom motion.
Figure 10:
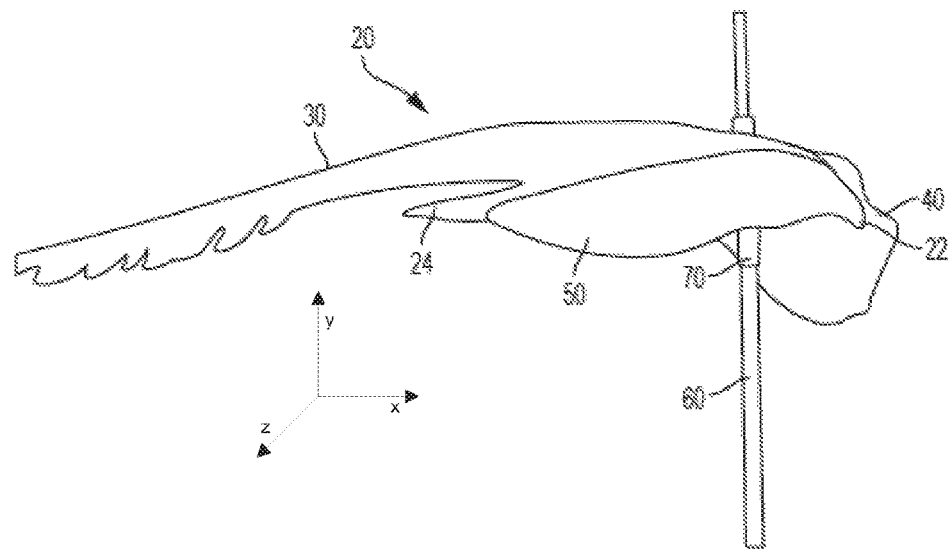
FIG. 10 is another side elevational view of the embodiment of FIG. 1.
Figures 11, 12:
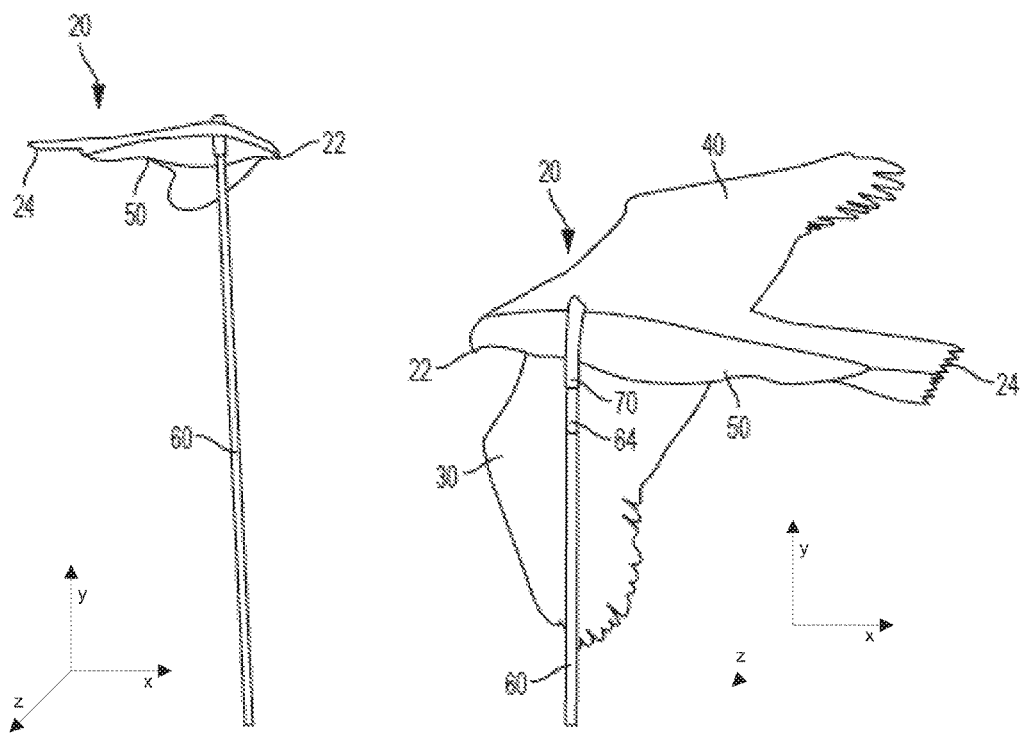
FIG. 11 is a bottom elevational view of the embodiment of FIG. 1
FIG. 12 is another bottom elevational view of the embodiment of FIG. 1.

FIG. 1 illustrates one exemplary embodiment of the bird-scaring device for dispelling pest birds. FIGS. 2-4 illustrate different perspective views of the bird-scaring device shown in FIG. 1. FIGS. 5-6 illustrate photographs illustrating bottom perspective views of the bird-scaring device. FIGS. 7-12 demonstrate top, side and bottom elevational views of the bird-scaring device shown in FIG. 1.

Referring to FIGS. 1 and 2, the bird-scaring device 10 may be configured to include an upper body segment 12, a main body segment 20 including a pair of wings, a lower body segment 50, a positioning element 60, a positioning element mount 70, an upper fastening element 62 and a lower fastening element 64. In some examples, the upper body segment and/or lower body segment may be integrated or part of the main body segment. The main body segment may be considered the body for purposes of discussion below. As described in more detail below, the positioning element mount may be coupled (either through positioning or through mechanical engagement) to the body. In some examples, the body may be pivotally mounted to the positioning element mount.

The bird-scaring device may comprise of thin flexible material. Due to the flexibility of the material the device may bend with moving air, resembling flight characteristics of flying birds. A variety of materials may be used to form the bird-scaring device body, including, but not limited to plastic, metal, or the like. The material type may be flexible enough to bend along with the wind and at the same time is durable and may retain tension against strong winds. As one example, and not as a limitation, the body material may be a polycarbonate sheet, such as, but not limited to, MAKROLON. The body material may include protective coatings to protect against environment conditions such as a UV protectorant, etc.

In some examples, the body material may be less than 1/16th of an inch. For example, in one embodiment, the body material may be 1/32nd of an inch. Other widths are considered and do not depart from the scope of the disclosure.

The main body element 20 includes a head end 22 and a tail end 24, a first wing segment 30 and a second wing segment 40. The head end 22 may be configured to curve downwards with respect to the alignment of the main body 20. The distance between the head end 22 and the tail end 24 defines length of the device 10, while the distance between a first leading edge 32 of the first wing segment 30 to a second leading edge 42 of the second wing segment 40 defines width of the device 10. As a non-limiting example, the wing span may be approximately 31 inches while the beak-to-tail measurement may be approximately 16 inches. In some embodiments, the wing span to beak-to-tail ratio may be approximately a 2 to 1 ratio or less. In other embodiments, the ratio may be greater than the 2 to 1 ratio.

It will be appreciated that in some embodiments, the body of the bird-scaring device may be configured as a single piece wherein the body 20, head end 22, tail end 24, and both wing segments 30, 40 are configured from a single piece of material. In this way, the single piece construction of the bird-scaring device may more closely mimic the natural motion of a predatory bird. For example, the flex of the body and wing portions relative to each other may move along with each other in a way that may more closely resemble natural rolling or yawing motions of a bird.

Further, in example embodiments wherein the body of the bird-scaring device is comprised of individual portions such as a head end 22, a tail end 24, a first wing segment 30 and a second wing segment 40, the portions of the body may be fixedly coupled to one another using a bonding material such as an industrial adhesive for example. In other embodiments, other attachments such as clamps may be used to couple the individual portions of the body of the bird-scaring device. In this way, it may be possible to alter the motion of the body of the device by fixedly securing the pieces to the main body element 20.

The aerodynamic center of pressure may be positioned toward the beak from the center line between the beak-to-tail measurement. In some examples, the aerodynamic center of pressure may be positioned at 30% of the beak-to-tail measurement from the beak. In other examples, the aerodynamic center of pressure may be further back towards the center-point or towards the tail. It should be appreciated that these measurements are provided for illustrative purposes only and are not intended to limit the present disclosure in anyway.

The curvature of the head end 22 of the device 20 simulates the appearance of head stooping as seen in predatory birds during landing or prey searching. In some embodiments the head end 22 may be bent further to resemble a beak region. In further embodiments, the head end 22 may include indentation in the main body segment 20 to replicate bird eyes.

The tail end 24 is curved and uneven to simulate tail feathers of predatory birds. In some embodiments, the tail end 24 may be configured to curve downwards to simulate flight characteristics of large predatory birds during landing or swooping down on preys. In some embodiments the tail end 24 may be configured to resemble fan-like appearance of tail feathers of large predatory birds such as falcons.

The first and second wing segments 30 and 40 may expand in a laterally extending manner and may be configured to be continuous with the main body segment 20. The wing segments 30 and 40 float with the moving wind, and may move up and down in a flapping motion due to aerodynamic effects. The flapping motion of the wing segments 30 and 40 allow the device 10 to closely resemble a bird in flight. Such flapping motion may be independent of any hinge mechanism. The absence of fastening elements for wings, tail or head region, allows for uninterrupted, frictionless, smooth movement of the bird device 10 with the ambient breeze. Presence of hinge mechanism including fastening elements, often cause noisy sporadic unrealistic wing and tail movements.

In an exemplary situation, pest birds such as pigeons entering fruit plantations may visualize the bird-scaring device 10 as a predatory bird, such as peregrine falcon in flight and may not venture to enter any further. In another exemplary situation, a small or medium sized pest bird feeding on fruits, may encounter the bird-scaring device swaying with the moving breeze. The smooth gliding motion of the device, along with the stooping curvature of the upper body segment resembling diving stroke of predatory birds, will scare away the pest bird feeding on fruits.

The bird-scaring device 10 may be pivotally mounted on a positioning element 60 in an area to be protected from pest birds. The positioning element may be flexible such that the bird-scaring device may rock or sway on the positioning element during a wind event. The amount of flexibility may depend on the use conditions. Regardless, the flexibility may allow the bird-scaring device to move from a vertical position to an off-center position during a wind event. For example, the bird-scaring device may move at least half its body from the vertical center-line position. In other embodiments, the bird scaring device may move one to two times the body width from the vertical center-line position. This wind flex may provide a realistic motion to the bird-scaring device.

As described above, the positioning element may be positioned in a desired bird control area. For example, the area may be an agricultural field such as a vegetable crop field or a fruit plantation area, a sports field, an airstrip, and such others. The device 10 includes a positioning element mount 50 to accommodate or receive the positioning element 60. The device 10 further includes an upper fastening element 62 and a lower fastening element 64. The upper fastening element 62 and the lower fastening element 64 may be to hold the body segments of the bird-scaring device 10 on the positioning element 40. The upper and lower fastening elements may be spaced apart to provide stops such that the bird device may be raised and lowered by the wind on the positioning element 60.

As a non-limiting example, the height of the positioning element may range between 45-50 inches. The height of the positioning element may allow visibility of the bird-scaring device 10 over a large area. Static ground level bird dispelling devices may only scare pest birds within short ranges. The longer range visibility of the device 10 allows growers' to dispel pest birds over large areas. Further, longer range visibility allows reduction in installation of several bird-scaring devices. It should be appreciated, that in some embodiments, the positioning element may be secured to another pole or rod depending on the application.

To assemble the device 10, the positioning element may be made to pass through the lower fastening element 64, the positioning element mount 70, the lower body segment 50, the main body segment 20, the upper body segment 12 and the upper fastening element 62. In some examples, the upper and lower fastening elements 62 and 64 may then be tightened by the user based on how high or low the user desires to position the body segments to move along the positioning element.

The positioning element may be a rod, or a pole, or a bar, or other such element. A variety of materials such as stainless steel, wrought iron and such others, may be used for the positioning element, to provide flexibility of movement in strong winds. As a non-limiting example, the positioning mount may be a ¼ inch ID tube and may be configured to be slid onto a cooperatively-sized pole such that the positioning mount may slide up and down on the positioning element. In some embodiments, the lower end of the positioning element may include a sharp edge such a spike to enable ease of digging the positioning element into the agricultural field. In further embodiments, the positioning element may include more than one lower end to enable firmer soil grip.

It should be appreciated that the bird-scaring device may be positioned on the positioning element through use of the positioning mount where the positioning mount is interdisposed between the upper and lower fastening elements. The positioning mount may slide upwards and downwards on the positioning element between the fastening elements which may operate as upper and lower stops.

The bird-scaring device has a freedom of movement in a number of directions. First, the bird-scaring device is mounted on a flexible mount (e.g. positioning element), such that the mount leans back and forth to enable the bird-scaring device to sway back and forth in an unexpected manner. As the pole leans back (such as due to a wind event), the beak of the device faces upward and the wings catch additional air or lift. This left results in the bird-scaring device sliding upwards on the pole in a vertical fashion to the upper fastening element. The bird-scaring device then slides downward on the pole (in a vertical direction) while also swaying forward on the flexible positioning element as the wind passes. The motion of the bird-scaring device, in some embodiments, includes motion in a vertical axis as it moves or slides up and down the positioning element while simultaneously moving in a horizontal direction due to the flex of the mount. Further, the wing lift of the bird-scaring device provides an additional unexpected motion allowing the bird to appear as if the bird is diving. Moreover, as described above, the bird-scaring device may be pivotally mounted to the positioning element mount or other similar structure.

In some embodiments, the bird-scaring device may be considered to have a number of degrees of freedom in movement, such as at least a three degree of freedom motion, a four degree of freedom motion, and a six degree of freedom motion. For example, the motion may include heaving 102, 103 (moving up 102 and down 103), swaying 104,106 (moving left 104 and right 106), surging 110,112 (moving forward 110 and backward 112) as well as, in some embodiments, pitching 116,118 (tilting forward 116 and backward 118), yawing 120, 122 (swivels left 120 and right 122) and/or rolling 124, 126 (pivoting side-to-side toward the left 126 or the right 124). Thus, the bird-scaring device may have one or more in combination of a heaving motion, a swaying motion, a pitching motion, a yawing motion, and/or a rolling motion. In some embodiments, both the positioning element and the body of the device exhibit motion. For example, in one embodiment, the positioning element may be flexible and may move forward, backward and side to side in conjunction with the body which may also exhibit motion forward, backward, and side to side for instance. Thus, in some examples, there may be three or more degrees of freedom, for example, in some embodiments; there may be four degrees of freedom for the bird-scaring device. In other embodiments, such as when the body is pivotally mounted to the positioning element mount, the positioning element mount is configured to slide on the positioning element and where the positioning element is flexible, the bird-scaring device may be considered to have 6 degrees of freedom.

In some example embodiments, the bird-scaring device may exhibit a variety of movements and motions as described briefly above. In one example, the device may have six degrees of freedom comprising a first motion, a second motion, and a third motion, wherein the body of the device may move in the vertical direction along the y axis (up or down) in a heaving motion, may rotate in a horizontal direction along the x axis (left or right) in a yawing or rolling motion, and may further oscillate back and forth along the z axis in a pitching motion as shown in the figures.

A first motion of the bird-scaring device may comprise movement in the vertical direction along the y axis and may resemble predatory bird motions such as heaving, gaining altitude or gaining or diving and swooping to hunt prey.

A second motion of the bird-scaring device may comprise movement in the horizontal direction along the x axis and may resemble the motions and actions of a predatory bird circling prey for example.

A third motion of the bird scaring device may comprise rolling or yawing movement along the z axis where the body of the device may oscillate back and forth to resemble the motions and actions of a predatory bird increasing or decreasing their flight speed for example.

In a further example embodiment, the bird-scaring device may have four degrees of freedom in which the body of the device may move horizontally along the x axis (left or right) and the body may further oscillate back and forth along the z axis.

The various degrees of freedom exhibited by the bird-scaring device may enhance its realistic nature and may further enhance the device's efficacy. For example, as the wind blows in different directions or at different speeds, the bird-scaring device may move about in different ways that may be unpredictable to pest birds. An unpredictable predatory bird may pose a greater risk to pest birds, and thus, the effectiveness of the device may be improved by having more than 3 degrees of freedom.

In some examples, the bird-scaring device may move around in an area as large as a 3 to 4 foot area. The degrees of freedom of the bird-scaring device may make the movements of the bird unpredictable, thus, making the bird-scaring device appear more life-like to pest birds. Specifically, the trajectory of the bird-scaring device along the positioning element and with the positioning element may make the bird-scaring device appear to swoop and glide. In some examples, the bird may move to the left or right a couple of feet. It should be appreciated, that the movement of the bird may be selectively controlled by adjusting the flexibility of the positioning element, adjusting the position of the upper and lower fastening elements (vertical drop) for the bird-scaring device, etc.

FIG. 3 illustrates a top perspective view of the device 10. As an illustration, and not a limitation, the outline of the wing segments 30 and 40 may be contoured to simulate the silhouette of spread out wings of predatory birds, such as peregrine falcons for example. Peregrine falcons (*Falco peregrinus*), also known as peregrines or duck hawks, are known for their widespread wings and characteristic hunting stoop. Peregrines have widespread distribution, including mountainous regions to tropical rain forests. The polar region being the only place lacking peregrine populations. Peregrines almost exclusively feed on medium-sized birds such as pigeons, doves, humming birds, and such others. However, sometimes, peregrines diet may include small animals and reptiles. Therefore, the silhouette of a stooping peregrine may trigger fear in medium-sized pest birds frequenting crop and fruit plantation areas.

In another embodiment, the bird-scaring device may be configured to resemble a larger predatory bird such as a bald eagle (*haliaeetus leucocephalus*) for example. The device may be configured to simulate the body size and shape of a bald eagle and may be larger in size than other embodiments configured to resemble hawks for example. Embodiments configured to resemble or simulate larger predatory birds such as the bald eagle may supplement the deterrent characteristics of the bird-scaring device in part due to the wider variety of prey sought by bald eagles. For example, large flocking birds such as geese may not be as deterred by a bird-scaring device configured to resemble a hawk or falcon for instance, mainly because of the size difference. While hawks and falcons are known to be predatory birds, they may not generally pose a significant threat to geese since hawks and falcons tend to be smaller in size or similar in size relative to geese. For this reason, geese may not be scared by the bird-scaring device since hawks and falcons may not typically prey on larger birds such as geese.

In some embodiments, the bird-scaring device may be further configured to resemble a predatory bird by way of ornamental coloration simulating natural colors of specific birds of prey. In one example, the bird-scaring device may be configured to resemble a bald eagle by way of painting the head end of the device white and providing a larger, more defined beak. In this way, as the bird-scaring device moves around, pest birds may be able to recognize the distinct coloration and beak shape/size of the bald eagle at a distance. This may improve the effectiveness of the bird-scaring device in part because the pest birds may be less inclined to move closer toward the device to determine if it may actually pose a threat.

The effectiveness of bird-scaring devices may rely heavily on the outward appearance and the motion of the device. Once a bird is able to recognize the bird-scaring device as inanimate, the device may no longer be effective. For this reason, various example embodiments may be configured to resemble a plurality of different predatory birds and may vary in appearance and shape. For example, an embodiment intended to deter geese may resemble a bald eagle and may comprise a body colored dark brown or blackish and may further comprise a head colored white with a relatively bright yellow colored beak. The bald eagle may further comprise white colored tail end intended to mimic the white tail feathers of bald eagles. Other example embodiments, such as an embodiment configured to resemble a peregrine falcon may comprise a body that ranges in color from black or gray to white. For example, peregrine falcons tend to have white or light colored chests and the color of their wings may typically fade from a greyish color near the rear end of the wings to a white color at the end of the wings closest to the bird's head. In this way, the bird-scaring device may be adapted to different areas of the world based on the type of predatory birds found in the location where the device is to be used.

As seen in FIG. 3, the wing 30 may be configured to include the first leading edge 32, a first upper leading segment 34, a first lower leading segment 36, a first outwardly curved segment 37 and a first inwardly curved segment 38. The body may be removably and rotatably coupled to the positioning element via the positioning element mount which may extend from the center of the body of the device. In this way, a vertical body movement space may be created in which the body may move up and down along the positioning element between the upper and lower fastening elements. The first upper leading segment 34 and the first lower leading segment 36 form upper outline for the first wing 30 while the first outwardly curved region 37 and the first inwardly curved region 38 form the lower or tail end outline of the wing 30. Similarly, the second wing 40 may be configured to include the second leading edge 42, a second upper leading segment 44, a second lower leading segment 46, a second outwardly curved segment 47 and a second inwardly curved segment 48.

In some embodiments, the leading edges 32 and 42, and the inwardly curved segments, 38 and 48, may be configured to include rounded curved structures interspersed by deep grooves to resemble feather ends as seen in extended wings of flying birds. The outwardly curved regions 37 and 47 may be configured to include closely packed curved structures with shallow grooves in between to resemble closely packed feathers as seen in the lower outline of wings of birds in flight. Such resemblance is in accordance with the appearance of wing feathers in birds, wherein the wing feathers closer to the body of the birds are closely packed compared to the large sparsely distributed feathers at the tip of the wings. In some embodiments, the inwardly curved region may be an additional piece to the device 10 and may need to be attached separately with bonding agents such as adhesives, resins and such others. In some examples, the wings may include realistic marking to make the wings and the device appear substantially similar to a selected bird type, such as, but not limited to, peregrine falcons.

FIG. 4 illustrates a bottom perspective view of the device 10, wherein the main body 20, is shown to further include a mid-line 26 and a projection segment 28. The mid-line 26 may be configured to be positioned along an imaginary center line passing through the main body segment 20, starting at the head end 22 and ending at the tail end 24. FIG. 4 further illustrates the lower body segment 50 and the positioning element mount 70. As illustrated, both the lower body segment 50 and the positioning element mount 70 may be positioned in perpendicular to the main body segment 20. In some embodiments, the lower body segment 50 is curved to resemble lower body curvature of birds.

FIGS. 5 and 6 illustrate further embodiments of the device 10, illustrating the main body segment 20 including the lower body segment 50 and the positioning element mount 70. As shown in FIGS. 5 and 6, the lower body segment 50 and the positioning element mount 70 may be placed along the mid line 26 of the main body segment 20.

As detailed above, the bird-scaring device 10 when operated in accordance with the present disclosure may provide impression of peregrines or such other predatory birds, flying with wings spread out and stooping as if diving on preys. The smooth frictionless unitary motion of the device 10 enhances realistic flight characteristics of predatory birds. Specifically, in some examples, when the upper and lower fastening elements are positioned to allow vertical drop or slide of the bird along the positioning element, then bird may appear to swoop. In some embodiments, the flexible positioning element provides further realism to the motion such that the device flexes as it slides up and down on the positioning element. These elements enable the bird to have unexpected movement. Therefore, the device 10 may provide long lasting bird scaring effect. Such long-lasting bird scaring effect may provide economic benefits to growers and other field or park managers, who otherwise, may need to use expensive and inhumane methods or conventional short-term deterrent devices for pest bird control.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub combinations of the various features, functions, acts, and/or properties disclosed herein, as well as any and all equivalents thereof.

The invention claimed is:

1. A bird-scaring device, comprising:
   a body shaped like a predatory bird;
   an adjustable positioning element;
   a pair of adjustable fastening elements; and
   at least a three degree of freedom motion;
   wherein the body of the device is affixed to the adjustable positioning element at a position perpendicular to a ground surface;
   wherein the pair of adjustable fastening elements secure the body of the device to the adjustable positioning element; and
   wherein the pair of adjustable fastening elements includes an upper fastening element and a lower fastening element spaced apart where the body moves between the pair of fastening elements.

2. The bird-scaring device of claim 1, wherein the body includes an upper body segment, a main body segment, and a lower body segment.

3. The bird-scaring device of claim 1, wherein the body is coupled to a positioning element mount.

4. The bird-scaring device of claim 3, wherein the positioning element mount is adapted to receive the positioning element.

5. The bird-scaring device of claim 3, wherein the positioning element mount slides on the positioning element between the pair of fastening elements.

6. The bird-scaring device of claim 1, wherein the body includes a first wing segment and a second wing segment.

7. The bird-scaring device of claim 1, wherein the positioning element is a flexible rod.

8. The bird-scaring device of claim 1, wherein the body is pivotally mounted to the adjustable positioning element.

9. The bird-scaring device of claim 1, wherein the body has four degree of freedom motion.

10. The bird-scaring device of claim 1, wherein the body has a six degree of freedom motion.

11. The bird-scaring device of claim 10, wherein the six degree of freedom motion comprises:
    a first motion of the body along a y axis including upward and downward movement relative to the positioning element,
    a second motion of the body along an x axis including movement to the left and right of the positioning element; and
    a third motion of the body along a z axis including backward and forward movement relative to the positioning element.

12. A bird-scaring device, comprising:
    an adjustable and flexible positioning element;
    a body shaped like a predatory bird having an upper body segment, a main body segment, a lower body segment, a first wing segment, and a second wing segment; where the body is moveably coupled to the positioning element;
    an adjustable upper fastening element coupled to the positioning element above the body; and
    an adjustable lower fastening element coupled to the positioning element below the body, where the upper fastening element and the lower fastening element form a vertical body movement space.

13. The bird-scaring device of claim 12, further comprising a positioning element mount pivotally mounted to the body;
    where the positioning element mount is configured to receive the positioning element.

14. The bird-scaring device of claim 12, wherein the body has four degrees of freedom.

15. The bird-scaring device of claim 14, wherein the four degrees of freedom comprise:
    a first motion of the body along a y axis including upward and downward movement relative to the positioning element, and a second motion of the body along an x axis including movement to the left and right of the positioning element.

16. The bird-scaring device of claim 12, wherein the body has six degrees of freedom.

17. The bird scaring device of claim 16, wherein the six degrees of freedom comprise:
- a first motion of the body along a y axis including upward and downward movement relative to the positioning element;
- a second motion of the body along an x axis including movement to the left and right of the positioning element; and
- a third motion of the body along a z axis including backward and forward movement relative to the positioning element.

18. A bird-scaring device comprising:
- a flexible positioning element,
- a bird-shaped body removably and rotatably coupled to the flexible positioning element, and
- a pair of fastening elements disposed on the flexible positioning element, wherein the bird-shaped body has at least a three degree of freedom motion, including heaving motion, swaying motion, surging motion, pitching motion, yawing motion, or rolling motion, and wherein the three degree of freedom motion comprises:
- a first motion of the body along a y axis including upward and downward movement relative to the positioning element, and
- a second motion of the body along an x axis including movement to the left and right of the positioning element.

* * * * *